United States Patent Office 3,328,415
Patented June 27, 1967

3,328,415
5-(2-HYDROXYETHYL)-4-THIAZOLIDONES AND DERIVATIVES THEREOF
Alexander R. Surrey, Albany, and William G. Webb, North Greenbush, N.Y., assignors to Sterling Drug Inc., New York, N.Y., a corporation of Delaware
No Drawing. Filed June 29, 1961, Ser. No. 120,502
12 Claims. (Cl. 260—301)

This invention relates to 5-(2-hydroxyethyl)-4-thiazolidones, carbamic acid esters and carboxylic acid esters thereof, and to processes and intermediates for the preparation thereof. More particularly, the invention relates to compounds having the formula

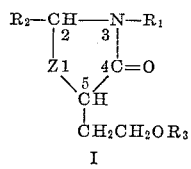

I wherein $R_1$ is a hydrogen atom or a lower-alkyl, lower-alkenyl, lower-alkoxy-lower-alkyl, lower-cycloalkyl, or monocarbocyclic aryl group; $R_2$ is a lower-alkyl or monocarbocyclic aryl group; $R_3$ is a hydrogen atom, or an unsubstituted carbamyl, N-lower-alkylcarbamyl, N,N-di-lower-alkylcarbamyl, N-lower-alkenyl-carbamyl, N,N-di-lower-alkenylcarbamyl, lower-alkanoyl, or monocarbocyclic aroyl group; and Z is a divalent sulfur atom (—S—), the sulfoxide group (—SO—), or the sulfone group (—SO$_2$—).

When either $R_1$ or $R_2$ is a lower-alkyl group, it can contain from one to about six carbon atoms and can be either straight or branched. Thus $R_1$ and $R_2$ each comprehend methyl, ethyl, isopropyl, n-butyl, n-hexyl, and the like.

When $R_1$ is a lower-alkenyl group, it can contain from three to about six carbon atoms and can be either straight or branched. Thus $R_1$ also comprehends 2-propenyl, 2-butenyl, 3-methyl-2-pentenyl, and the like.

When $R_1$ is a lower-alkoxy-lower-alkyl group, the lower-alkyl portion of said group can contain from two to three linear carbon atoms, and the lower-alkoxy portion of said group can contain from one to four carbon atoms and can be either straight or branched. Thus $R_1$ also comprehends 2-methoxyethyl, 2-ethoxyethyl, 2-isopropoxyethyl, 2-butoxyethyl, 3-methoxypropyl, 3-isobutoxypropyl, and the like.

When $R_1$ is a lower-cycloalkyl group, it can contain from three to seven carbon atoms and thus comprehends cyclopropyl, cyclopentyl, cyclohexyl, 4-methylcyclohexyl, cycloheptyl, and the like.

When $R_1$ or $R_2$ is a monocarbocyclic aryl group, it represents phenyl or phenyl substituted by from one to about three substituents exemplified by a lower-alkyl containing from one to four carbon atoms (for example methyl or isopropyl), lower-alkoxy containing from one to four carbon atoms (for example methoxy, ethoxy or n-butoxy), halogen (including fluorine, chlorine, bromine, and iodine), lower-alkanoylamino containing from one to four carbon atoms (for example formylamino, acetylamino, or propionylamino), lower-alkylmercapto containing from one to four carbon atoms (for example methylmercapto or n-butylmercapto), lower-alkylsufonyl containing from one to four carbon atoms (for example methylsulfonyl or n-butylsulfonyl), and the like. When more than one of such substituents are present, they can be the same or different and can occupy any of the available positions with respect to one another.

When $R_3$ is monocarbocyclic aroyl, it represents benzoyl or benzoyl substituted by from one to three substituents of the nature described above in the definition of $R_1$ and $R_2$ as monocarbocyclic aryl.

When $R_3$ is N-lower-alkylcarbamyl or N,N-di-lower-alkylcarbamyl, the lower-alkyl portions can contain from one to four carbon atoms and can be either straight or branched, and when $R_3$ is N,N-di-lower-alkylcarbamyl, the two lower-alkyl groups can be the same or different. Thus $R_3$ comprehends, inter alia, N-methylcarbamyl, N-ethylcarbamyl, N-isobutylcarbamyl, N,N-dimethylcarbamyl, N-ethyl-N-methylcarbamyl, N,N-dibutylcarbamyl, and the like.

When $R_3$ is N-lower-alkenylcarbamyl or N,N-di-lower-alkenylcarbamyl, the lower-alkenyl portion can contain from three to four carbon atoms and can be either straight or branched, and when $R_3$ is N,N-di-lower-alkenylcarbamyl, the two lower-alkenyl groups can be the same or different. Thus $R_3$ comprehends inter alia, N-[1-(2-propenyl)]carbamyl, N-[1-(2-methyl-2-propenyl)]-carbamyl, N,N-bis-[1-(2-propenyl)]carbamyl, N - [1-(2-propenyl)]-N-[(2-methyl-2-propenyl)]carbamyl, and the like.

When $R_3$ is lower-alkanoyl, it can contain from one to about four carbon atoms and can be either straight or branched. Thus $R_3$ comprehends, inter alia, formyl, acetyl, isobutyryl, and the like.

The compounds of Formula I where $R_3$ is hydrogen and Z is a divalent sulfur atom are prepared preferably by reacting α-mercaptobutyrolactone with an aldehyde, $R_2CHO$, in the presence of ammonia (e.g. from ammonium carbonate) to form the compounds where $R_1$ is H or in the presence of a primary amine, $R_1NH_2$, to form the compounds where $R_1$ is other than H as defined above. The reaction is carried out at a temperature in the range from about 65° to about 110° C. The reaction probably takes place in three steps which may be illustrated by the equations:

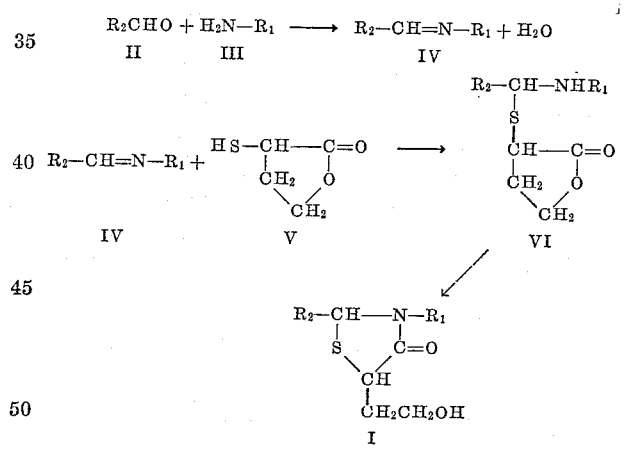

Thus in the first step, the aldehyde, $R_2$—CHO is condensed with ammonia (III where $R_1$ is H; derived from a source of ammonia as described hereinbelow) or a primary amine (III where $R_1$ is other than H as defined above) to yield an imine (IV where $R_1$ is H) or an N-substituted-imine (IV where $R_1$ is other than H), respectively, plus water. In the second step the α-mercaptobutyrolactone adds to the carbon-nitrogen double bond of the imine (IV) to give the aminomethylmercaptobutyrolactone derivative (VI) which, in the final step, opens at the lactone group and recyclizes to give the thiazolidone. The process can, if desired, be carried out in one operation without isolating the imine (IV), or alternatively the imine can be prepared separately by reacting the aldehyde, $R_2$—CHO, with the amine, $R_1NH_2$, or source of ammonia and the imine, after isolation and purification, can be reacted with the α-mercapto-butyrolactone. Since one molar equivalent of water is formed in the first step for each mole of thiazolidone produced, the extent of condensation can be followed and the reaction extent ascertained by carrying out the reaction in an inert, non-polar solvent such as benzene, toluene or xylene and collecting the water in a continuous separator (Dean-Stark trap) attached to the apparatus. The reaction is continued until no more water is collected.

The above procedure, while being the preferred method of preparing our 5-(2-hydroxyethyl)-4 thiazolidones, can be modified, but usually with decreased yields. For example, the preparation can be run at lower temperatures down to about room temperature, but the reaction time required is longer, or it can be carried out without a solvent or using other solvents such as ethanol, isopropanol, n-hexane, and the like.

The α-mercaptobutyrolactone of Formula V, required as an intermediate for the preparation of the compounds of Formula I, is prepared by reacting α-bromobutyrolactone with thiourea and hydrolyzing the thiouronium salt produced with aqueous alkali metal hydroxide or equivalent source of hydroxide ions. The thiouronium salt can be isolated and purified before hydrolyzing if desired, but it is preferred to hydrolyze the salt directly without prior isolation. The reaction with the thiourea is conducted at a temperature in the range from about 40° C. to about 90° C. in an organic solvent inert under the conditions of the reaction, for example ethanol, methanol, isopropanol, and the like while the hydrolysis is conducted at a temperature in the range from about 30° C. to about 80° C. The reactions are represented by the equations:

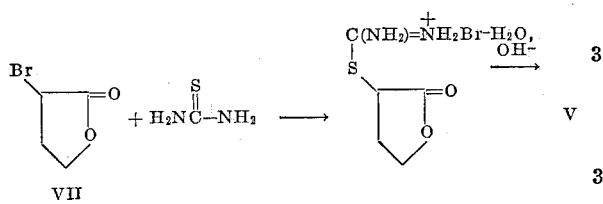

Alternatively the α-mercaptobutyrolactone of Formula V can be prepared by reacting α-bromobutyrolactone with an alkali metal salt of a thiol-lower-alkanoic acid and hydrolyzing the thiol ester produced. The thiol ester can be isolated and purified before hydrolysis if desired or hydrolyzed directly without prior isolation. The reaction of the thiol-lower-alkanoic acid salt with the α-bromobutyrolactone is conducted at a temperature in the range from about 0° C. to about 50° C. in an organic solvent inert under the conditions of the reaction, for example methanol, ethanol, isopropanol, or the like. The hydrolysis of the thiol ester is conducted at a temperature in the range from about 50° C. to about 100° C. either in an aqueous medium or in aqueous alcohol solutions. The hydrolysis can be carried out either under acidic conditions using dilute mineral acids, for example hydrochloric acid, sulfuric acid, or phosphoric acid, or under alkaline conditions using, for example alkali metal hydroxides. It is preferred to use a dilute mineral acid as the hydrolyzing agent, and a preferred thiol-lower-alkanoic acid in thiol-acetic acid. The reactions are represented by the equations:

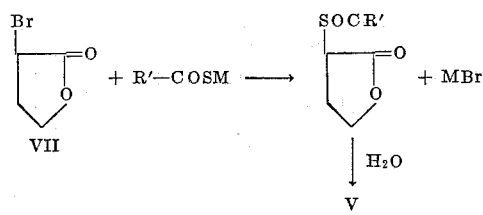

where R' is lower-alkyl containing from one to about four carbon atoms, and M is an alkali metal such as potassium or sodium.

The preparation of our 5-(2-hydroxyethyl)-4-thiazolidones of Formula I where Z is S and $R_1$ is H is carried out according to the procedure described and illustrated above using an aminating agent, or a source of ammonia, i.e. a compound having a high ammonia partial pressure which usually loses ammonia on standing and which decomposes readily when heated to lose ammonia. Such aminating agents are generally ammonium salts of weak acids, i.e. one having an ionization constant of about $10^{-6}$ or weaker. Thus aminating agents suitable in our process include ammonium carbonate, ammonium bicarbonate, ammonium carbamate, and the like. In carrying out our invention, we prefer to use as the aminating agent commercial ammonium carbonate which actually is a mixture of ammonium bicarbonate and ammonium carbamate (see page 64 of the Seventh Edition of "The Merck Index," Merck and Co., Inc., Rahway, N.J., 1960 or page 810 of the fourth edition of Ephraim's "Inorganic Chemistry," Nordeman Publishing Co., Inc., New York, N.Y., 1943). Thus, when hereafter used, ammonium carbonate will mean commercial ammonium carbonate.

The compounds of our invention where $R_3$ is unsubstituted-carbamyl, N-lower-alkylcarbamyl, N,N-di-lower-alkylcarbamyl, N-lower-alkenylcarbamyl, or N,N - di-lower-alkenylcarbamyl are prepared by reacting the 5-(2-hydroxyethyl)-4-thiazolidones of Formula I (where $R_3$ is H) in the presence of an acid-acceptor with either one molar equivalent of phosgene or one molar equivalent of phenyl chloroformate followed by reaction of the resulting 5-(2-chlorocarbonyloxy) - 4 - thiazolidone or 5-(2-phenoxycarbonyloxyethyl)-4-thiazolidone with ammonia (to give the compounds where $R_3$ is $CONH_2$), a primary lower-alkyl- or lower - alkenylamine (to give the compounds where $R_3$ is CONH-lower-alkyl or CONH-lower-alkenyl), or a secondary di-lower-alkyl- or di - lower-alkenylamine (to give the compounds where $R_3$ is $CON(lower-alkyl)_2$ or $CON(lower-alkenyl)_2$). The reactions are represented by the following equations where X is a chlorine atom or the phenoxy group, each of R' and R" are H, lower-alkyl or lower-alkenyl, and $R_1$ and $R_2$ have the meanings given above:

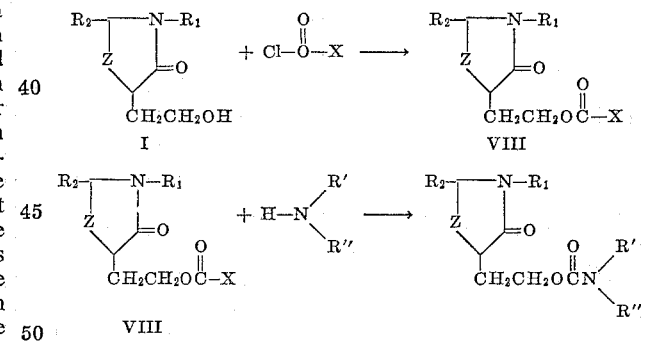

The purpose of the acid-acceptor is to take up the hydrogen chloride split out during the course of the reaction. It is a basic substance which forms water-soluble by-products easily separable from the main product and includes, such substances as pyridine, dimethylaniline, and the like. The reaction is preferably carried out at a temperature in the range from about 0° C. to about 30° C. in an organic solvent inert under the conditions of the reaction, for example benzene, toluene, xylene, chloroform, ethylene di-chloride, and the like.

The compounds of our invention where $R_3$ is a lower-alkanoyl or monocarbocyclic aroyl group are prepared by reacting the compounds of Formula I where $R_3$ is H in the presence of an acid-acceptor, for example pyridine or dimethylaniline, with a lower-alkanoyl halide or lower-alkanoic anhydride or a monocarbocyclic aroyl halide or monocarbocyclic aroyl anhydride. The reaction is preferably carried out at a temperature in the range from about 0° C. to about 100° C. in an organic solvent inert under the conditions of the reaction; for example pyridine, benzene, toluene, chloroform, ethylene dichloride, and the like.

The compounds of Formula I where Z is the sulfoxide group (—SO—) are prepared by oxidizing the corresponding compounds where Z is S with one molar equivalent of an oxidizing agent effective to oxidize sulfides to sulfoxides. Various oxidative procedures can be employed, but the one preferred in practicing our invention comprises using one molar equivalent of a perorganic acid, e.g. peracetice acid, performic acid, or perbenzoic acid, in a suitable solvent e.g., acetone, ethyl acetate, ethanol, methanol, isopropanol, and the like. The reaction is exothermic and is carried out preferably by mixing the reactants at a low temperature, i.e. from 0° C. to 20° C. In some cases, the temperature of the reaction mixture rose rapidly to temperatures as high as 40° C.

The compounds of Formula I where Z is the sulfone group ($-SO_2-$) are prepared by oxidizing the corresponding compounds where Z is S with two molar equivalents of an oxidizing agent effective to oxidize sulfides to sulfones. Various oxidative procedures can be employed, but the one preferred in practicing our invention comprises using two molar equivalents of a perorganic acid, e.g. peracetic acid, performic acid, or perbenzoic acid, in a suitable solvent, for example, acetone, ethanol, methanol, ethyl acetate, acetic acid, and the like. The reaction, like the oxidation of the sufide group to the sulfoxide, is exothermic and is carried out preferably by mixing the reactants at a temperature around 0° C. to 20° C.

The compounds of our invention have been tested by standard pharmacological evaluation procedures and found to possess activity as central nervous system depressants, in particular, internuncial blocking, anticonvulsant, antipyretic, and barbiturate potentiating properties.

The chemical structures of our 5-(2-hydroxyethyl)-4-thiazolidones and corresponding carbamic acid and carboxylic acid esters, and 1-oxides and 1,1-dioxides are established by the mode of their syntheses and corroborated by the correspondence of calculated and found values for the elementary analyses for representative examples.

The following examples will further illustrate specific embodiments of the invention without the latter being limited thereto.

*Example 1.—α-Bromobutyrolactone* [VII]

In a one liter three-necked flask equipped with a stirrer, an internal thermometer and a dropping funnel was placed 200 g. (2.32 moles) of butyrolactone and 27.2 g. (0.88 atom) of red phosphorous. Bromine (380 g., 2.38 moles, 122 ml.) was added dropwise with stirring over a period of two hours while maintaining the temperature between 20° and 30° C. When addition was complete, the mixture was stirred for one hour at 20° C. and then treated with an additional 390 g. (2.42 moles, 125 ml.) of bromine added over a period of one hour while maintaining the temperature at 70° C. After stirring and heating for one hour at 80° C., 100 ml. of water was added cautiously over a period of one hour. The mixture was then stirred and heated for four hours at 90°–95° C. and then treated with 400 ml. of water added over a period of an hour and a half. After cooling, the reaction mixture was extracted with methylene dichloride and the extracts washed first with sodium bisulfite solution, then with water and the solvent removed in vacuo. The residual brown oil was distilled in vacuo to give 300 g. of α-bromobutyrolactone, B.P. 118–125° C./8 mm., $n_D^{25}=1.5062$.

*Example 2.—α-Mercaptobutyrolactone* [V]

*Procedure A.*—A mixture of 33.0 g. (0.2 mole) of α-bromobutyrolactone and 15.2 g. (0.2 mole) of thiourea in 100 ml. of ethanol was heated under reflux for four hours. The bulk of the solvent was then taken off in vacuo, 100 ml. of water was added, the mixture warmed to 40° C. and a solution of 16.0 g. (0.4 mole) of sodium hydroxide in 100 ml. of water added dropwise with stirring over a period of forty-five minutes while maintaining the temperature, between 40° and 50° C. stirring at 50° C. was continued for one hour, and the mixture was then cooled to room temperature, acidified with 35 ml. of concentrated hydrochloric acid and extracted with ethyl acetate. The extracts were dried, the solvent removed in vacuo and the residual oil distilled in vacuo to give 9.5 g. of α-mercaptobutyrolactone, B.P. 118°–120° C./8 mm., $n_D^{25}=1.5101$.

*Analysis.*—Calcd. for $C_4H_6O_2S$: —SH, 28.7. Found: —SH, 24.43.

*Procedure B.*—To a solution of 14.7 g. (0.26 mole) of potassium hydroxide in ethanol containing a little water was added 20 g. (0.26 mole) of thiolacetic acid. The solution was evaporated to dryness, the residue was redissolved in alcohol and the solution cooled to 10° C. To the latter solution was added a cooled (10° C.) solution of 33 g. (0.2 mole) of α-bromobutyrolactone in ethanol. The mixture was swirled, filtered to remove the precipitated potassium bromide and the filtrate evaporated almost to dryness. The residue was heated on a steam bath for two hours with a little 6 N hydrochloric acid, then cooled and extracted with chloroform. The extracts were dried, taken to dryness and the residual oil distilled in vacuo to give 15 g. of α-mercaptobutyrolactone, B.P. 69–72° C./0.4–0.5 mm.

*Example 3.—N-methylbenzalimine* [IV; $R_1$ is $CH_3$, $R_2$ is $C_6H_5$]

A solution of 4.2 g. (0.4 mole) of benzaldehyde and 12.4 g. (0.4 mole) of methylamine in 250 ml. of benzene was heated under reflux for six hours using a Dean-Stark trap to collect the water formed during the reaction. The benzene was then removed in vacuo and the residual oil distilled in vacuo giving 36.4 g. of N-methylbenzylimine; B.P. 37–42° C./0.5–0.6 mm., $n_D^{25}=1.5492$.

The compounds of the following examples were prepared according to the procedure described above in Example 3.

*Example 4*

(a) 4-chlorobenzaldehyde was reacted with methylamine in benzene to give N-methyl-4-chlorobenzalimine [IV; $R_1$ is $CH_3$, $R_2$ is $4\text{-}ClC_6H_4$], B.P. 42–46° C./0.3 mm., $n_D^{25}=1.5670$.

(b) 2,4-dichlorobenzaldehyde was reacted with methylamine in benzene to give N-methyl-2,4-dichlorobenzalimine [IV; $R_1$ is $CH_3$, $R_2$ is $2,4\text{-}Cl_2C_6H_3$], B.P. 79–80° C./0.1 mm.

(c) 3,4-dichlorobenzaldehyde was reacted with methylamine in benzene to give N-methyl-3,4-dichlorobenzalimine [IV; $R_1$ is $CH_3$, $R_2$ is $3,4\text{-}Cl_2C_6H_3$], B.P. 67–71° C./0.2 mm., $n_D^{25}=1.5855$.

(d) Benzaldehyde was reacted with ethylamine in benzene to give N-ethylbenzalimine [IV; $R_1$ is $C_2H_5$, $R_2$ is $C_6H_5$], B.P. 43–49° C./0.31 mm., $n_D^{26}=1.5361$.

(e) 4-chlorobenzaldehyde was reacted with ethylamine in benzene to give N-ethyl-4-chlorobenzalimine [IV; $R_1$ is $C_2H_5$, $R_2$ is $4\text{-}ClC_6H_4$], B.P. 50–54° C./0.3–0.4 mm., $n_D^{25}=1.5570$.

(f) 2,4-dichlorobenzaldehyde was reacted with ethylamine in benzene to give N-ethyl-2,4-dichlorobenzalimine [IV; $R_1$ is $C_2H_5$, $R_2$ is $2,4\text{-}Cl_2C_6H_3$], B.P. 68–74° C./0.4–0.5 mm., $n_D^{25}=1.5699$.

(g) 3,4-dichlorobenzaldehyde was reacted with ethylamine in benzene to give N-ethyl-3,4-dichlorobenzalimine [IV; $R_1$ is $C_2H_5$, $R_2$ is $3,4\text{-}Cl_2C_6H_3$], B.P. 76–80° C./0.4 mm., $n_D^{25}=1.5720$.

(h) 4-methylbenzaldehyde was reacted with ethylamine in benzene to give N-ethyl-4-methylbenzaldimine [IV; $R_1$ is $C_2H_5$, $R_2$ is $4\text{-}CH_3C_6H_4$], B.P. 40–43° C./0.12 mm., $n_D^{25}=1.5368$.

(i) 4-isopropylbenzaldehyde was reacted with ethylamine in benzene to give N-ethyl-4-isopropylbenzalimine [IV; $R_1$ is $C_2H_5$, $R_2$ is $4\text{-}(CH_3)_2CHC_6H_4$], B.P. 64–71° C./.04 mm., $n_D^{25}=1.5251$.

(j) 2-chlorobenzaldehyde was reacted with methylamine in benzene to give N-methyl-2-chlorobenzalimine [IV; $R_1$ is $CH_3$, $R_2$ is 2-$ClC_6H_4$], B.P. 40–41° C./0.2 mm., $n_D^{25}$=1.5678.

(k) 4-methoxybenzaldehyde was reacted with methylamine in benzene to give N-methyl-4-methoxybenzalimine [IV; $R_1$ is $CH_3$, $R_2$ is 4-$CH_3OC_6H_4$], B.P. 58–60° C./0.2–0.3 mm., $n_D^{25}$=1.5675.

(m) 4-isopropylbenzaldehyde was reacted with methylamine in benzene to give N-methyl-4-isopropylbenzalimine [IV; $R_1$ is $CH_3$, $R_2$ is 4-$(CH_3)_2CHC_6H_4$], B.P. 52–55° C./0.2 mm., $n_D^{25}$=1.5340.

(n) 2-chlorobenzaldehyde was reacted with ethylamine in benzene to give N-ethyl-2-chlorobenzalimine [IV; $R_1$ is $C_2H_5$, $R_2$ is 2-$ClC_6H_4$], B.P. 42–47° C./0.2 mm., $n_D^{25}$=1.5510.

(o) 4-methoxybenzaldehyde was reacted with ethylamine in benzene to give N-ethyl-4-methoxybenzalimine [IV; $R_1$ is $C_2H_5$, $R_2$ is 4-$CH_3OC_6H_4$], B.P. 73–75° C./ 0.5 mm., $n_D^{25}$=1.5538.

(p) 4-methylbenzaldehyde was reacted with methylamine in benzene to give N-methyl-4-methylbenzalimine [IV; $R_1$ is $CH_3$, $R_3$ is 4-$CH_3C_6H_4$], B.P. 48–52° C./0.5 mm., $n_D^{25}$=1.5482.

(q) 3,4 - dimethoxybenzaldehyde was reacted with methylamine in benzene to give N-methyl-3,4-dimethoxybenzalimine [IV; $R_1$ is $CH_3$, $R_2$ is 3,4-$(CH_3O)_2C_6H_3$], B.P. 98–100° C./0.4 mm., M.P. 47–52° C.

(r) 2-methylbenzaldehyde was reacted with methylamine in benzene to give N-methyl-2-methylbenzalimine [IV; $R_1$ is $CH_3$, $R_2$ is 2-$CH_3C_6H_4$], B.P. 42–48° C./0.5 mm., $n_D^{25}$=1.5340.

(s) 3-methylbenzaldehyde was reacted with methylamine in benzene to give N-methyl-3-methylbenzalimine [IV; $R_1$ is $CH_3$, $R_2$ is 3-$CH_3C_6H_4$], B.P. 45–48° C./0.4 mm., $n_D^{25}$=1.5448.

*Example 5.—2-(4-chlorophenyl) - 5-(2-hydroxyethyl)-4-thiazolidone* [I; $R_1$ is H, $R_2$ is 4-$ClC_6H_4$, $R_3$ is H, Z is S]

A mixture of 14.0 g. (0.1 mole) of 4-chlorobenzaldehyde, 6.0 g. (0.5 mole) of finely ground ammonium carbonate, and 11.6 g. (0.1 mole) of α-mercaptobutyrolactone in 200 ml. of benzene was heated under reflux for three hours using a Dean-Stark trap to collect the water formed during the reaction. The reaction mixture was poured into 200 ml. of water containing 10.5 ml. of concentrated ammonium hydroxide and the solid which separated was collected, dried and recrystallized from ethylene dichloride to give 3.8 g. of 2-(4-chlorophenyl)-5-(2-hydroxyethyl)-4-thiazolidone, M.P. 145.4–147.4° C. (corr.).

*Example 6*

2-(3,4-dichlorophenyl)-3-(2-methoxyethyl) - 5 - (2-hydroxyethyl)-4-thiazolidone [I; $R_1$ is $CH_2CH_2OCH_3$, $R_2$ is 3,4-$Cl_2C_6H_3$, $R_3$ is H, Z is S] was prepared from 18.4 g. (0.1 mole) of 3,4-dichlorobenzaldehyde, 7.9 g. (0.1 mole) of 2-methoxyethylamine and 14 g. (0.12 mole) of α-mercaptobutyrolactone in 250 ml. of benzene according to the procedure described above in Example 5. The product was purified by distillation in vacuo to give 5 g. of 2-(3,4-dichlorophenyl) - 3-(2-methoxyethyl)-5-(2-hydroxyethyl)-4-thiazolidone, B.P. 138–140° C./0.2 mm. as an orange oil.

By following the manipulative procedure described above in Example 5, there can be obtained:

2-(2-chlorophenyl)-3-methyl-5-(2-hydroxyethyl)-4 - thiazolidone [I; $R_1$ is $CH_3$, $R_2$ is 2-$ClC_6H_4$, $R_3$ is H, Z is S] from 2-chlorobenzaldehyde, methylamine, and α-mercaptobutyrolactone, 2-(4-methoxyphenyl)-3-methyl - 5 - (2-hydroxyethyl)-4-thiazolidone [I; $R_1$ is $CH_3$, $R_2$ is 4-$CH_3OC_6H_4$, $R_3$ is H, Z is S] from 4-methoxybenzaldehyde, methylamine, and α-mercaptobutyrolactone, 2-(4-isopropylphenyl)-3-methyl - 5 - (2-hydroxyethyl)-4-thiazolidone [I; $R_1$ is $CH_3$, $R_2$ is 4-$(CH_3)_2CHC_6H_4$, $R_3$ is H, Z is S] from 4-isopropylbenzaldehyde, methylamine, and α-mercaptobutyrolactone, 2-(2-chlorophenyl)-3-ethyl-5-(2-hydroxyethyl)-4-thiazolidone [I; $R_1$ is $C_2H_5$, $R_2$ is 2-$ClC_6H_4$, $R_3$ is H, Z is S] from 2-chlorobenzaldehyde, ethylamine, and α-mercaptobutyrolactone, 2-(4-methoxyphenyl)-3-ethyl-5-(2-hydroxyethyl)-4-thiazolidone [I; $R_1$ is $C_2H_5$, $R_2$ is 4-$CH_3OC_6H_4$, $R_3$ is H, Z is S] from 4-methoxybenzaldehyde, ethylamine, and α-mercaptobutyrolactone, 2-(4-methylphenyl)-3-methyl-5-(2-hydroxyethyl)-4-thiazolidone [I; $R_1$ is $CH_3$, $R_2$ is 4-$CH_3C_6H_4$, $R_3$ is H, Z is S] from 4-methylbenzaldehyde, methylamine, and α-mercaptobutyrolactone, 2-(3,4-dimethoxyphenyl)-3-methyl-5-(2-hydroxyethyl)-4-thiazolidone [I; $R_1$ is $CH_3$, $R_2$ is 3,4-$(CH_3O)_2C_6H_3$, $R_3$ is H, Z is S] from 3,4-dimethoxybenzaldehyde, methylamine, and α-mercaptobutyrolactone, 2-(2-methylphenyl)-3-methyl-5-(2-hydroxyethyl)-4-thiazolidone [I; $R_1$ is $CH_3$, $R_2$ is 3-$CH_3C_6H_4$, $R_3$ is H, Z is S] from 2-methylbenzaldehyde, methylamine, and αmercaptobutyrolactone, 2-(3-methylphenyl)-3-methyl-5-(2-hydroxyethyl)-4-thiazolidone [I; $R_1$ is $CH_3$, $R_2$ is 3-$CH_3C_6H_4$, $R_3$ is H, Z is S] from 3-methylbenzaldehyde, methylamine, and α-mercaptobutyrolactone, 2-phenyl-3-n-hexyl-5-(2-hydroxyethyl)-4-thiazolidone [I; $R_1$ is n-$C_6H_{13}$, $R_2$ is $C_6H_5$, $R_3$ is H, Z is S] from benzaldehyde, n-hexylamine, and α-mercaptobutyrolactone, 2 - (4 - acetylaminophenyl) - 3 - allyl - 5 - (2 - hydroxyethyl)-4-thiazolidone [I; $R_1$ is $CH_2$=$CHCH_2$, $R_2$ is 4-$CH_3CONHC_6H_4$, R is H, Z is S] from 4-acetylaminobenzaldehyde, allylamine, and α - mercaptobutyrolactone, 2-(4-methylmercaptophenyl)-3-(2-methoxyethyl)-5-(2-hydroxyethyl)-4-thiazolidone [I; $R_1$ is $CH_2CH_2OCH_3$, $R_2$ is 4-$CH_3SC_6H_4$, $R_3$ is H, Z is S] from 4-methylmercaptobenzaldehyde, 2-methoxyethylamine, and α-mercaptobutyrolactone, 2 - (4 - methylsulfonylphenyl) - 3 - cyclohexyl - 5 - (2-hydroxyethyl)-4-thiazolidone [I; $R_1$ is $C_6H_{11}$, $R_2$ is 4-$CH_3SO_2C_6H_4$, $R_3$ is H, Z is S] from 4-methylsulfonylbenzaldehyde, cyclohexylamine, and α-mercaptobutyrolactone, 2-methyl-3-phenyl-5-(2-hydroxyethyl)-4-thiazolidone [I; $R_1$ is $C_6H_5$, $R_2$ is $CH_3$, $R_3$ is H, Z is S] from acetaldehyde, aniline, and α-mercaptobutyrolactone, and 2-(n-hexyl)-3-(4-chlorophenyl)-5-(2-hydroxyethyl)-4-thiazolidone [I; $R_1$ is 4-$ClC_6H_4$, $R_2$ is n-$C_6H_{13}$, $R_3$ is H, Z is S] from n-heptaldehyde, 4-chloroaniline, and α-mercaptobutyrolactone.

*Example 7.—2-phenyl-3-methyl - 5 - (2-hydroxyethyl)-4-thiazolidone* [I; $R_1$ is $CH_3$, $R_2$ is $C_6H_5$, $R_3$ is H, Z is S]

A solution of 23.5 g. (0.2 mole) of N-methylbenzalimine and 23.3 g. (0.2 mole) of α-mercaptobutyrolactone in 300 cc. of benzene was heated under reflux for two and a half hours. The solvent was removed in vacuo and the residual oil distilled to give a main fraction of B.P. 141–146° C./0.3 mm. which crystallized on trituration with hexane. The solid was recrystallized from benzene to give 12 g. of 2-phenyl-3-methyl-5-(2-hydroxyethyl)-4-thiazolidone, M.P. 81.2–86.2° C. (corr.).

The compounds of the following examples were prepared according to the procedure described above in Example 7.

*Example 8*

(a) N-methyl-4-chlorobenzalimine was reacted with α-mercaptobutyrolactone in benzene to give 2-(4-chlorophenyl)-3-methyl-5-(2-hydroxyethyl) - 4 - thiazolidone [I; $R_1$ is $CH_3$, $R_2$ is 4-$ClC_6H_4$, $R_3$ is H, Z is S], M.P.

104.2–106.6° C. (corr.) (recrystallized from benzene).

(b) N-methyl-2,4-dichlorobenzalimine was reacted with α-mercaptobutyrolactone in benzene to give 2-(2,4-dichlorophenyl)-3-methyl-5-(2-hydroxyethyl)-4-thiazolidone [I; $R_1$ is $CH_3$, $R_2$ is $2,4-Cl_2C_6H_3$, $R_3$ is H, Z is S], M.P. 90.2–91.2° C. (corr.) (recrystallization from ethylene dichloride-hexane).

(c) N-methyl-3,4-dichlorobenzalimine was reacted with α-mercaptobutyrolactone in benzene to give 2-(3,4-dichlorophenyl)-3-methyl-5-(2-hydroxyethyl)-4-thiazolidone [I; $R_1$ is $CH_3$, $R_2$ is $3,4-Cl_2C_6H_3$, $R_3$ is H, Z is S], M.P. 107.2–110.4° C. (corr.) (recrystallized from benzene).

(d) N-ethylbenzalimine was reacted with α-mercaptobutyrolactone in benzene to give 2-phenyl-3-ethyl-5-(2-hydroxyethyl)-4-thiazolidone [I; $R_1$ is $C_2H_5$, $R_2$ is $C_6H_5$, $R_3$ is H, Z is S], B.P. 150–153° C./0.1 mm.

(e) N-ethyl-4-chlorobenzalimine was reacted with α-mercaptobutyrolactone in benzene to give 2-(4-chlorophenyl)-3-ethyl-5-(2-hydroxyethyl)-4-thiazolidone [I; $R_1$ is $C_2H_5$, $R_2$ is $4-ClC_6H_4$, $R_3$ is H, Z is S], B.P. 167–171° C./0.15 mm.

(f) N-ethyl-2,4-dichlorobenzalimine was reacted with α-mercaptobutyrolactone in benzene to give 2-(2-4-dichlorophenyl)-3-ethyl-5-(2-hydroxyethyl)-4-thiazolidone [I; $R_1$ is $C_2H_5$, $R_2$ is $2,4-Cl_2C_6H_3$, $R_3$ is H, Z is S], M.P. 110.8–113.4° C. (corr.) (recrystallized from benzene).

(g) N-ethyl-3,4-dichlorobenzalimine was reacted with α-mercaptobutyrolactone in benzene to give 2-(3,4-dichlorophenyl)-3-ethyl-5-(2-hydroxyethyl)-4-thiazolidone [I; $R_1$ is $C_2H_5$, $R_2$ is $3,4-Cl_2C_6H_3$, $R_3$ is H, Z is S], M.P. 82.8–86.6° C. (corr.) (recrystallized from ethylene dichloride-pentane).

(h) N-ethyl-4-methylbenzalimine was reacted with α-mercaptobutyrolactone in benzene to give 2-(4-methylphenyl)-3-ethyl-5-(2-hydroxyethyl)-4-thiazolidone [I; $R_1$ is $C_2H_5$, $R_2$ is $4-CH_3C_6H_4$, $R_3$ is H, Z is S], B.P. 150° C./0.25 mm.

(i) N-ethyl-4-isopropylbenzalimine was reacted with α-mercaptobutyrolactone in benzene to give 2-(4-isopropylphenyl)-3-ethyl-5-(2-hydroxyethyl)-4-thiazolidone [I; $R_1$ is $C_2H_5$, $R_2$ is $4-(CH_3)_2CHC_6H_4$, $R_3$ is H, Z is S], M.P. 65.4–70.0° C. (corr.) (recrystallized from ethyl ether).

By following the manipulative procedure described above in Example 7, there can be obtained:

2-(2-chlorophenyl)-3-methyl-5-(2-hydroxyethyl)-4-thiazolidone [I; $R_1$ is $CH_3$, $R_2$ is $2-ClC_6H_4$, $R_3$ is H, Z is S] from N-methyl-2-chlorobenzalimine and α-mercaptobutyrolactone, 2-(4-methoxyphenyl)-3-methyl-5-(2-hydroxyethyl)-4-thiazolidone [I; $R_1$ is $CH_3$, $R_2$ is $4-CH_3OC_6H_4$, $R_3$ is H, Z is S] from N-methyl-4-methoxybenzalimine and α-mercaptobutyrolactone, 2-(4-isopropylphenyl)-3-methyl-5-(2-hydroxyethyl)-4-thiazolidone [I; $R_1$ is $CH_3$, $R_2$ is $4-(CH_3)_2CHC_6H_4$, $R_3$ is H, Z is S] from N-methyl-4-isopropylbenzalimine and α-mercaptobutyrolactone, 2-(2-chlorophenyl)-3-ethyl-5-(2-hydroxyethyl)-4-thiazolidone [I; $R_1$ is $C_2H_5$, $R_2$ is $2-ClC_6H_4$, $R_3$ is H, Z is S] from N-ethyl-2-chlorobenzalimine and α-mercaptobutyrolactone, 2-(4-methoxyphenyl)-3-ethyl-5-(2-hydroxyethyl)-4-thiazolidone [I; $R_1$ is $C_2H_5$, $R_2$ is $4-CH_3OC_6H_4$, $R_3$ is H, Z is S] from N-ethyl-4-methoxybenzalimine and α-mercaptobutyrolactone, 2-(4-methylphenyl)3-methyl-5-(2-hydroxyethyl)-4-thiazolidone [I; $R_1$ is $CH_3$, $R_2$ is $4-CH_3C_6H_4$, $R_3$ is H, Z is S] from N-methyl-4-methylbenzalimine and α-mercaptobutyrolactone, 2-(3,4-dimethoxyphenyl)-3-methyl-5-(2-hydroxyethyl)-4-thiazolidone [I; $R_1$ is $CH_3$, $R_2$ is $3,4-(CH_3O)_2C_6H_3$, $R_3$ is H, Z is S] from N-methyl-3-4-dimethoxybenzalimine and α-mercaptobutyrolactone, 2-(2-methylphenyl)-3-methyl-5-(2-hydroxyethyl)-4-thiazolidone [I; $R_1$ is $CH_3$, $R_2$ is $2-CH_3C_6H_4$, $R_3$ is H, Z is S] from N-methyl-2-methylbenzalimine and α-mercaptobutyrolactone, and 2-(3-methylphenyl)-3-methyl-5-(2-hydroxyethyl)-4-thiazolidone [I; $R_1$ is $CH_3$, $R_2$ is $3-CH_3C_6H_4$, $R_3$ is H, Z is S] from N-methyl-3-methylbenzalimine and α-mercaptobutyrolactone.

*Example 9.—2-(4-chlorophenyl)-3-methyl-5-(2-carbamyloxyethyl)-4-thiazolidone [I; $R_1$ is $CH_3$, $R_2$ is $4-ClC_6H_4$, $R_3$ is $CONH_2$, Z is S]*

To a solution of 8.0 g. (0.03 mole) of 2-(4-chlorophenyl)-3-methyl-5-(2-hydroxyethyl)-4-thiazolidone in 15 ml. of dry pyridine cooled in an ice bath was added dropwise over a period of thirty minutes 4.6 g. (0.03 mole) of phenyl chloroformate. The solution was stirred at room tempertaure for three hours, then diluted with 100 cc. of ice water and extracted with ether. The ether extracts were washed first with dilute hydrochloric acid, then with saturated sodium bicarbonate solution, dried, and the solution concentrated to a volume of about 75 ml. The ethereal solution was then added all at once to 75 ml. of liquid ammonia in a flask equipped with a mechanical stirrer and a cold finger. The mixture was stirred and refluxed for seven hours and the ammonia then allowed to boil away. The residue solid was taken into ethylene dichloride, extracted twice with dilute sodium hydroxide, the organic layer dried and evaporated to dryness and the residual solid recrystallized from isopropanol to give 7.2 g. of 2-(4-chlorophenyl)-3-methyl-5-(2-carbamyloxyethyl)-4-thiazolidone, M.P. 127°–129° C. (corr.)

*Example 10.—2-(4-chlorophenyl)-5-(2-carbamyloxyethyl)-4-thiazolidone [I; $R_1$ is H, $R_2$ is $4-ClC_6H_4$, $R_3$ is $CONH_2$, Z is S]*

To a solution of 4.6 g. (0.05 mole) of phosgene in 50 ml. of toluene was added portionwise a slurry of 12.0 g. (0.05 mole) of 2-(4-chlorophenyl)-5-(2-hydoxyethyl)-4-thiazolidone in 25 ml. of chloroform, 15 ml. of toluene and 4.0 g. of dimethylaniline while maintaining the temperature between 5° C. and 10° C. The mixture was then rendered strongly alkaline with anhydrous ammonia, diluted with water, and the solid which separated was collected, dried and recrystallized from ethanol to give 1.6 g. of 2-(4-chlorophenyl)-5-(2-carbamyloxyethyl)-4-thiazolidone, M.P. 180.0–181.8° C. (corr.).

The compounds of the following examples were prepared according to the procedure described above in Example 3.

*Example 11*

(a) 2-phenyl-3-methyl-5-(2-hydroxyethyl)-4-thiazolidone was reacted with phosgene in the presence of dimethylaniline and the resulting chloroformate reacted with anhydrous ammonia to give 2-phenyl-3-methyl-5-(2-carbamyloxyethyl)-4-thiazolidone [I; $R_1$ is $CH_3$, $R_2$ is $C_6H_5$, $R_3$ is $CONH_2$, Z is S], M.P. 152.2–153.8° C. (corr.) (recrystallized from isopropanol).

(b) 2-phenyl-3-ethyl-5-(2-hydroxyethyl)-4-thiazolidone was reacted with phosgene in the presence of dimethylaniline and the resulting chloroformate reacted with anhydrous ammonia to give 2-phenyl-3-ethyl-5-(2-carbamyloxyethyl)-4-thiazolidone [I; $R_1$ is $C_2H_5$, $R_2$ is $C_6H_5$, $R_3$ is $CONH_2$, Z is S], M.P. 92.2–94.4° C. (corr.) (recrystallized from ethylene dichloride-pentane).

(c) 2-(4-chlorophenyl)-3-ethyl-5-(2-hydroxyethyl)-4-thiazolidone was reacted with phosgene in the presence of dimethylaniline and the resulting chloroformate reacted with anhydrous ammonia to give 2-(4-chlorophenyl)-3-ethyl-5-(2-carbamyloxyethyl)-4-thiazolidone [I; $R_1$ is $C_2H_5$, $R_2$ is $4-ClC_6H_4$, $R_3$ is $CONH_2$, Z is S], M.P. 137.2–139.8° C. (corr.) (recrystallized from ethylene dichloride).

(d) 2 - (2,4 - dichlorophenyl) - 3 - ethyl - 5 - (2 - hydroxyethyl)-4-thiazolidone was reacted with phosgene in the presence of dimethylaniline and the resulting chloroformate reacted with anhydrous ammonia to give 2-(2,4 - dichlorophenyl)-3-ethyl-5-(2-carbamyloxyethyl)-4-thiazolidone [I; $R_1$ is $C_2H_5$, $R_2$ is 2,4-$Cl_2C_6H_3$, $R_3$ is $CONH_2$, Z is S], M.P. 132.0–133.4° C. (corr.) (recrystallized from benzene).

(e) 2 - (3,4 - dichlorophenyl) - 3 - ethyl - 5 - (2 - hydroxyethyl)-4-thiazolidone was reacted with phosgene in the presence of dimethylaniline and the resulting chloroformate reacted with anhydrous ammonia to give 2 - (3,4 - dichlorophenyl) - 3 - ethyl - 5 - (2-carbamyloxyethyl)-4-thiazolidone [I; $R_1$ is $C_2H_5$, $R_2$ is 3,4-$Cl_2C_6H_3$, $R_3$ is $CONH_2$, Z is S], M.P. 97.0–99.2° C. (corr.) (recrystallized from benzene-pentane).

(f) 2 - (4 - methylphenyl) - 3 - ethyl - 5 - (2-hydroxyethyl)-4-thiazolidone was reacted with phosgene in the presence of dimethylaniline and the resulting chloroformate reacted with anhydrous ammonia to give 2-(4-methylphenyl) - 3 - ethyl-5-(2-carbamyloxyethyl)-4-thiazolidone [I; $R_1$ is $C_2H_5$, $R_2$ is 4-$CH_3C_6H_4$, $R_3$ is $CONH_2$, Z is S], M.P. 129.0–131.4° C. (corr.) (recrystallized from ethylene dichloride-pentane).

(g) 2 - (4 - isopropylphenyl) - 3 - ethyl - 5 - (2 - hydroxyethyl)-4-thiazolidone was reacted with phosgene in the presence of dimethylaniline and the resulting chloroformate reacted with anhydrous ammonia to give 2 - (4 - isopropylphenyl) - 3 - ethyl - 5 - (2 - carbamyloxyethyl)-4-thiazolidone [I; $R_1$ is $C_2H_5$, $R_2$ is

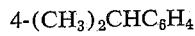

$R_3$ is $CONH_2$, Z is S], M.P. 92.2–94.0° C. (corr.) (recrystallized from ethylene dichloride-hexane).

By following the manipulative procedure described above in Examples 9 or 10, there can be obtained:

2 - (4 - methoxyphenyl) - 3 - methyl - 5 - [2 - (N - methylcarbamyloxy)ethyl]-4-thiazolidone [I; $R_1$ is $CH_3$, $R_2$ is 4-$CH_3OC_6H_4$, $R_3$ is $CONHCH_3$, Z is S] from 2 - (4 - methoxyphenyl) - 3 - methyl - 5 - (2 - hydroxyethyl)-4-thiazolidone, phosgene and methylamine, 2 - (3,4 - dimethoxyphenyl) - 3 - methyl - 5 - [2 - (N,N - diethylcarbamyloxy)-ethyl]-4-thiazolidone [I; $R_1$ is $CH_3$, $R_2$ is 3,4-$(CH_3O)_2C_6H_3$, $R_3$ is $CON(C_2H_5)_2$, Z is S] from 2-(3,4-dimethoxyphenyl)-3-methyl-5-(2-hydroxyethyl)-4-thiazolidone, phosgene and diethylamine, 2 - phenyl - 3 - n - hexyl - 5 - [2 - (N - allylcarbamyloxy)ethyl]-4-thiazolidone [I; $R_1$ is n-$C_6H_{13}$, $R_2$ is $C_6H_5$, $R_3$ is $CONHCH_2CH=CH_2$, Z is S] from 2-phenyl-3-n - hexyl - 5-(2-hydroxyethyl)-4-thiazolidone, phosgene and allylamine, 2 - (4 - methylmercaptophenyl) - 3 - (3-methoxypropyl) - 5 - [2 - (N,N - diallylcarbamyloxy)ethyl] - 4 - thiazolidone [I; $R_1$ is $CH_2CH_2CH_2OCH_3$, $R_2$ is 4-$CH_3SC_6H_4$, $R_3$ is $CON(CH_2CH=CH_2)_2$, Z is S] from 2-(4-methylmercaptophenyl) - 3-(3-methoxypropyl)-5-(2-hydroxyethyl)-4-thiazolidone, phosgene, and diallylamine, and 2 - (4- methylsulfonylphenyl) - 3 - cyclohexyl - 5 - [2 - (N-ethylcarbamyloxy)-ethyl]-4-thiazolidone [I; $R_1$ is $C_6H_{11}$, $R_2$ is 4-$CH_3SO_2C_6H_4$, $R_3$ is $CONHC_2H_5$, Z is S] from 2 - (4 - methylsulfonylphenyl) - 3 - cyclohexyl - 5 - (2 - hydroxyethyl)-4-thiazolidone, phosgene and ethylamine.

*Example 12.*—*2 - (4 - chlorophenyl) - 3 - methyl - 5 - (2-acetoxyethyl)-4-thiazolidone* [I; $R_1$ is $CH_3$, $R_2$ is 4-$ClC_6H_4$, $R_3$ is $CH_3CO$, Z is S]

By reacting 2-(4-chlorophenyl)-3-methyl-5-(2-hydroxyethyl)-4-thiazolidone with acetyl chloride in the presence of pyridine in an organic solvent inert under the conditions of the reaction, for example ethylene dichloride, there can be obtained 2-(4-chlorophenyl)-3-methyl-5-(2-acetoxyethyl)-4-thiazolidone.

*Example 13.*—*2 - (4 - chlorophenyl) - 5 - (2 - benzoyloxyethyl)-4-thiazolidone* [I; $R_1$ is H, $R_2$ is 4-$ClC_6H_4$, $R_3$ is $C_6H_5CO$, Z is S].

By reacting 2-(4-chlorophenyl)-5-(2-hydroxyethyl)-4-thiazolidone with benzoic acid anhydride in the presence of pyridine in an organic solvent inert under the conditions of the reaction, for example toluene, there can be obtained 2 - (4 - chlorophenyl)-5-(2-benzoyloxyethyl)-4-thiazolidone.

By following the manipulative procedure described above in Example 13, there can be obtained:

2 - (4 - methylsulfonylphenyl) - 3 - cyclohexyl - 5 - [2 - (4-chlorobenzoyloxy)-ethyl]-4-thiazolidone [I; $R_1$ is $C_6H_{11}$, $R_2$ is 4-$CH_3SO_2C_6H_4$, $R_3$ is 4-$ClC_6H_4CO$, Z is S] from 2 - (4-methylsulfonylphenyl)-3-cyclohexyl-5-(2-hydroxyethyl)-4-thiazolidone and 4-chlorobenzoic acid anhydride, and 2 - n - hexyl - 3 - (4 - chlorophenyl) - 5 - [2,4 - methylbenzoyloxy)ethyl]-4-thiazolidone [I; $R_1$ is 4-$ClC_6H_4$, $R_2$ is n-$C_6H_{13}$, $R_3$ is 4-$CH_3C_6H_4CO$, Z is S] from 2-n-hexyl - 3 - (4 - chlorophenyl) - 5-(2-hydroxyethyl)-4-thiazolidone and 4-methylbenzoic acid anhydride.

*Example 14.*—*2 - (4 - chlorophenyl) - 3 - methyl - 5 - (2-hydroxyethyl)-4-thiazolidone-1,1-dioxide* [I; $R_1$ is $CH_3$, $R_2$ is 4-$ClC_6H_4$, $R_3$ is H, Z is $SO_2$].

A solution of 7.0 g. (0.03 mole) of 2-(4-chlorophenyl)-3 - methyl - 5-(2-hydroxyethyl)-4-thiazolidone in ethanol was cooled to about 15° C. and treated with a cold solution (4° C.) of 10.8 g. (0.06 mole) of 40% peracetic acid in 50 ml. of ethanol. The solution was swirled, treated with a little sodium bisulfite solution, taken to dryness, and the residual oil crystallized from benzene to give 2.7 g. of 2-(4-chlorophenyl)-3-methyl-5-(2-hydroxyethyl)-4-thiazolidone-1,1-dioxide, M.P. 127.0–134.4° C. (corr.).

The compounds of the following examples were prepared according to the procedure described above in Example 14.

*Example 15*

(a) 2 - (3,4 - dichlorophenyl) - 3 - methyl - 5 - (2 - hydroxyethyl)-4-thiazolidone in ethanol was oxidized with peracetic acid in ethanol to give 2-(3,4-dichlorophenyl) - 3 - methyl - 5-(2-hydroxyethyl)-4-thiazolidone-1,1-dioxide [I; $R_1$ is $CH_3$, $R_2$ is 3,4-$Cl_2C_6H_3$, $R_3$ is H, Z is $SO_2$], M.P. 157.8–159.6° C. (corr.) (recrystallized from ethanol).

(b) 2 - (2,4 - dichlorophenyl) - 3 - ethyl - 5 - (2-hydroxyethyl)-4-thiazolidone in ethanol was oxidized with peracetic acid in ethyl acetate to give 2-(2,4-dichlorophenyl) - 3 - ethyl - 5 - (2 - hydroxyethyl)-4-thiazolidone-1,1-dioxide [I; $R_1$ is $C_2H_5$, $R_2$ is 2,4-$Cl_2C_6H_3$, $R_3$ is H, Z is $SO_2$], M.P. 120.6–122.4°C. (corr.) (recrystallized from benzene-hexane).

(c) 2 - (3,4 - dichlorophenyl) - 3 - (2 - methoxyethyl)-5-(2-hydroxyethyl) - 4 - thiazolidone in benzene was oxidized with peracetic acid in ethyl acetate to give 2-(3, 4 - dichlorophenyl) - 3 - (2 - methoxyethyl) - 5 - (2-hydroxyethyl) - 4 - thiazolidone - 1,1 - dioxide [I; $R_1$ is $CH_2CH_2OCH_3$, $R_2$ is 3,4-$Cl_2C_6H_3$, $R_3$ is H, Z is $SO_2$], M.P. 120.2–125.2°C. (corr.) (recrystallized from ethylene dichloride-hexane).

By following the procedure described above in Example 14, theren can be obtained:

2 - phenyl - 3 - methyl - 5 - (2 - hydroxyethyl) - 4 - thiazolidone-1-oxide [I; $R_1$ is $CH_3$, $R_2$ is $C_6H_5$, $R_3$ is H, Z is SO] from 2-phenyl-3-methyl-5-(2-hydroxyethyl)-4-thiazolidone and one molar epuivalent of peracetic acid, 2 - phenyl - 3 - ethyl - 5 - (2 - hydroxyethyl) - 4 - thiazolidone-1-oxide [I; $R_1$ is $C_2H_5$, $R_2$ is $C_6H_5$, $R_3$ is H, Z is SO] from 2-phenyl-3-ethyl-5-(2-hydroxyethyl)-4-thiazolidone and one molar equivalent of peracetic acid, 2 - methyl - 3 - phenyl - 5 - (2 - hydroxyethyl) - 4 - thiazolidone-1-oxide [I; $R_1$ is $C_6H_5$, $R_2$ is $CH_3$, $R_3$ is H, Z is SO] from 2-methyl-3-phenyl-5-(2-hydroxyethyl) - 4 - thiazolidone and one molar equivalent amount of peracetic acid, 2 - (4 - chlorophenyl) - 3 - methyl - 5 - (2 - carbamyloxyethyl)-4-thiazolidone-1,1-dioxide [I; $R_1$ is $CH_3$, $R_2$ is 4-$ClC_6H_4$, $R_3$ is $CONH_2$, Z is $SO_2$] from 2-(4-chlorophenyl)-3-methyl - 5 - (2-carbamyloxyethyl)-4-thiazolidone and two molar equivalents of peracetic acid, 2 - (4 - methoxyphenyl) - 3 - methyl - 5 - [2 - (N-methylcarbamyloxy)ethyl] - 4 - thiazolidone - 1,1 - dioxide [I; $R_1$ is $CH_3$, $R_2$ is 4-$CH_2OC_6H_4$, $R_3$ is $CONHCH_3$, Z is $SO_2$] from 2 - (4 - methoxyphenyl) - 3 - methyl - 5-[2-(N-methylcarbamyloxy)ethyl] - 4 - thiazolidone and two molar equivalents of peracetic acid, 2 - (3,4 - dimethoxyphenyl) - 3 - methyl - 5 - [2 - (N,N-diethylcarbamyloxy)ethyl] - 4 -thiazolidone - 1,1 - dioxide [I; $R_1$ is $CH_3$, $R_2$ is 3,4-$(CH_3O)_2C_6H_3$, $R_3$ is $CON(C_2H_5)_2$, Z is $SO_2$] from 2-(3,4-dimethoxyphenyl) - 3 - methyl - 5 - [2 - (N,N-diethylcarbamyloxy)ethyl]-4-thiazolidone and two molar equivalents of peracetic acid, 2 - phenyl - 3 - n - hexyl - 5 - [2 - (N - allylcarbamyloxy)ethyl]-4-thiazolidone-1,1-dioxide [I; $R_1$ is n-$C_6H_{13}$, $R_2$ is $C_6H_5$, $R_3$ is $CONHCH_2CH=CH_2$, Z is $SO_2$] from 2-phenyl - 3 - n - hexyl - 5 - [2 - (n - allylcarbamyloxy)ethyl]-4-thiazolidone and two molar equivalents of peracetic acid, 2 - (4 - methylsulfonylphenyl) - 3 - cyclohexyl - 5 - [2-(N - ethylcarbamyloxy) - ethyl] - 4 - thiazolidone - 1,1-dioxide [I; $R_1$ is $C_6H_{11}$, $R_2$ is 4-$CH_3SO_2C_6H_4$, $R_3$ is $CONHC_2H_5$, Z is $SO_2$] from 2-(4-methylsulfonylphenyl)-3-cyclohexyl - 5 - [2 - (N - ethylcarbamyloxy) ethyl]-4-thiazolidone and two molar equivalents of peracetic acid, 2-(4-chlorophenyl) - 3 - methyl - 5 - (2 - acetoxyethyl)-4-thiazolidone-1,1-dioxide [I; $R_1$ is $CH_3$, $R_2$ is 4-$ClC_6H_4$, $R_3$ is $CH_3SO$, Z is $SO_2$] from 2-(4-chlorophenyl)-3-methyl-5-(2-acetoxyethyl)-4-thiazolidone and two molar equivalents of peracetic acid, and 2 - (4 - chlorophenyl) - 5 - (2 - benzoyloxyethyl) - 4 - thiazolidone - 1,1 - dioxide [I; $R_1$ is H, $R_2$ is 4-$ClC_6H_4$, $R_3$ is $C_6H_5CO$, Z is $SO_2$] from 2-(4-chlorophenyl)-5-(2 - benzoyloxyethyl) - 4 - thiazolidone and two molar equivalents of peracetic acid.

The compounds of Formula I, when administered to mice to which 40 mg./kg. of hexobarbital had been administered produced potentiation of hexobarbital-induced sleeping time, thus indicating their usefulness as sedatives. Thus the effective dose ($ED_{50}$) of 2-(2,4-dichlorophenyl)-3-ethyl-5-(2-carbamyloxyethyl)-4-thiazolidone (Example 11(d)) in potentiating the effects of hexobarbital in mice was found to be 55±41.3 mg./kg. (orally).

The compounds of Formula I have also been found to protect mice from the hind limb component of maximal electroshock seizures, thus indicating their usefulness as anticonvulsant agents. Thus 2-(4-chlorophenyl)-3-methyl-5-(2-carbamyloxyethyl)-4-thiazolidone (Example 9) protected ten mice out of a group of ten for four hours against electroshock induced convulsions at a dose of 400 mg./kg.

The compounds of Formula I can be prepared for use by incorporation in unit dosage form as tablets or capsules for oral administration either alone or in combination with suitable adjuvants such as calcium carbonate, starch, lactose, talc, magnesium stearate, gum acacia, and gelatin. Still further the compounds can be formulated for oral administration in aqueous alcohol, glycol or oil solutions, or oil-water emulsions in the same manner as conventional medicinal substances are prepared.

We claim:
1. A compound of the formula

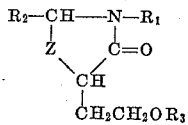

wherein $R_1$ is a member of the group consisting of hydrogen, lower-alkyl, lower-alkenyl, lower-alkoxy-lower-alkyl, lower-cycloalkyl containing from three to seven carbon atoms in the cycloalkyl ring, phenyl, and phenyl substituted by from one to three members of the group consisting of lower-alkyl, lower-alkoxy, halogen, lower-alkanoylamino, lower-alkylmercapto, and lower-alkylsulfonyl; $R_2$ is a member of the group consisting of lower-alkyl, phenyl, and phenyl substituted by from one to three members of the group consisting of lower-alkyl, lower-alkoxy, halogen, lower-alkanoylamino, lower alkylmercapto, and lower-alkylsulfonyl; $R_3$ is a member of the group consisting of hydrogen, unsubstituted carbamyl, N-lower-alkylcarbamyl, N,N - di - lower - alkylcarbamyl, N-lower - alkenylcarbamyl, N,N - di - lower-alkenylcarbamyl, lower-alkanoyl, benzoyl, and benzoyl substituted by from one to three members of the group consisting of lower-alkyl, lower-alkoxy, halogen, lower-alkanoylamino, lower-alkylmercapto, and lower-alkylsulfonyl; and Z is a member of the group consisting of divalent sulfur, the sulfoxide group and the sulfone group.

2. A compound of the formula

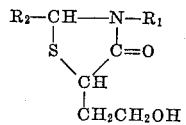

wherein $R_1$ is lower-alkyl and $R_2$ is chlorophenyl.

3. A compound of the formula

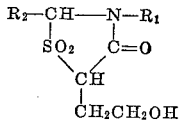

wherein $R_1$ is lower-alkyl and $R_2$ is chlorophenyl.

4. A compound of the formula

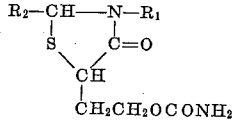

wherein $R_1$ is lower-alkyl and $R_2$ is phenyl.

5. A compound of the formula

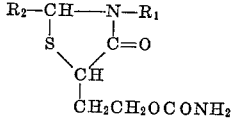

wherein $R_1$ is lower-alkyl and $R_2$ is chlorophenyl.

6. A compound of the formula

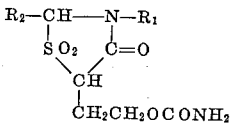

wherein $R_1$ is lower-alkyl and $R_2$ is chlorophenyl.

7. 2-(4 - chlorophenyl) - 3 - methyl - 5 - (2 - hydroxyethyl)-4-thiazolidone.

8. 2 - phenyl - 3 - methyl - 5 - (2-hydroxyethyl)-4-thiazolidone.

9. 2 - (3,4 - dichlorophenyl) - 3 - methyl-5-(2-hydroxyethyl)-4-thiazolidone.

10. 2 - (4 - chlorophenyl) - 3 - methyl-5-(2-hydroxyethyl)-4-thiazolidone-1,1-dioxide.

11. 2-(4-chlorophenyl)-3-methyl-5-(2-carbamyloxyethyl)-4-thiazolidone.

12. 2-(2,4-dichlorophenyl)-3-ethyl-5-(2-carbamyloxyethyl)-4-thiazolidone.

References Cited

UNITED STATES PATENTS 2,623,048  12/1952  Long et al. _____ 260—306.7

FOREIGN PATENTS 801,992  2/1951  Germany.

OTHER REFERENCES

Chemical Abstracts, vol. 39, pp. 5956 and 5963–6 (1945).

Elderfield, Heterocyclic Compounds, vol. 5, pp. 698–9 (1957).

Fieser et al., Advanced Organic Chemistry, New York, 1961, pp. 904–928.

Fieser et al., Advanced Organic Chemistry, New York, 1961, p. 575.

Lucas, Organic Chemistry, second edition, New York, 1953, pp. 297–299.

Theilheimer, Synthetic Methods, vol. 11, p. 289 (1957).

Theilheimer, Synthetic Methods, vol. 14, p. 312 (1960).

Wagner et al., Synthetic Organic Chemistry, new York, 1953, pp. 290, 483–4, 646–7, 778–9 and 827.

ALEX MAZEL, *Primary Examiner.*

D. T. McCUTCHEN, N. S. RIZZO, JOHN D. RANDOLPH, H. R. JILES, *Examiners.*

A. D. ROLLINS, J. W. ADAMS, *Assistant Examiners.*

UNITED STATES PATENT OFFICE
CERTIFICATE OF CORRECTION

Patent No. 3,328,415                                                                 June 27, 1967

Alexander R. Surrey et al

It is hereby certified that error appears in the above numbered patent requiring correction and that the said Letters Patent should read as corrected below.

Column 4, lines 36 and 37, for "Cl-$\overset{\overset{O}{\|}}{O}$-X" read -- Cl-$\overset{\overset{O}{\|}}{C}$-X --; column 5, line 5, for "acetice" read -- acetic --; column 6, line 7, for "1,5101" read -- 1.5101 --; column 7, line 22, for "$R_3$" read -- $R_2$ --; line 63, for "0.2 mm." read -- 0.02 mm. --; column 8, line 34, for "R" read -- $R_3$ --; column 9, line 6, for "recrystallization" read -- recrystallized --; column 10, line 32, for "129°" read -- 129.2° --; column 12, line 21, for "[2,4" read -- [2-(4 --; column 13, line 16, for "4-$CH_2OC_6H_4$" read -- 4-$CH_3OC_6H_4$ --.

Signed and sealed this 22nd day of October 1968.

(SEAL)
Attest:

EDWARD M. FLETCHER, JR.                                       EDWARD J. BRENNER
Attesting Officer                                                    Commissioner of Patents